(12) United States Patent
Kim et al.

(10) Patent No.: US 8,004,623 B2
(45) Date of Patent: Aug. 23, 2011

(54) SOLT MACHINE-REEL GAME CONVERSION TYPE PICTURE ON THE SCREEN DISPLAY PANEL REFLECT STRUCTURE

(75) Inventors: Yong Beom Kim, Incheon (KR); Woon Yong Park, Kyeonggi-Do (KR); Kyu Yeol Kim, Kyeonggi-Do (KR)

(73) Assignee: Tovis Co., Ltd., Gangwon-do (KR)

( * ) Notice: Subject to any disclaimer, the term of this patent is extended or adjusted under 35 U.S.C. 154(b) by 278 days.

(21) Appl. No.: 12/514,073

(22) PCT Filed: Nov. 14, 2006

(86) PCT No.: PCT/KR2006/004762
§ 371 (c)(1),
(2), (4) Date: May 7, 2009

(87) PCT Pub. No.: WO2008/056842
PCT Pub. Date: May 15, 2008

(65) Prior Publication Data
US 2010/0045881 A1    Feb. 25, 2010

(30) Foreign Application Priority Data

Nov. 7, 2006 (KR) .................. 10-2006-0109548

(51) Int. Cl.
*G02F 1/1335* (2006.01)
*A63F 9/24* (2006.01)
*A63F 13/00* (2006.01)
*G06F 17/00* (2006.01)
*G06F 19/00* (2006.01)

(52) U.S. Cl. .............. 349/16; 349/1; 349/12; 463/20; 463/31

(58) Field of Classification Search ............. 349/1, 5, 349/7, 11, 12, 16; 463/20, 31
See application file for complete search history.

(56) References Cited

U.S. PATENT DOCUMENTS

| | | | |
|---|---|---|---|
| 5,610,735 A | 3/1997 | Ohmae et al. | |
| 5,617,226 A | 4/1997 | Ohmae et al. | |
| 7,220,181 B2 * | 5/2007 | Okada | 463/32 |
| 7,234,697 B2 * | 6/2007 | Okada | 273/143 R |
| 7,485,039 B2 * | 2/2009 | Okada | 463/20 |
| 7,656,471 B2 * | 2/2010 | Ota et al. | 349/58 |
| 7,695,364 B2 * | 4/2010 | Okada | 463/20 |
| 2004/0266521 A1 * | 12/2004 | Kojima | 463/20 |
| 2006/0089192 A1 * | 4/2006 | Okada | 463/20 |
| 2009/0104989 A1 * | 4/2009 | Williams et al. | 463/31 |
| 2010/0184510 A1 * | 7/2010 | Nittou | 463/30 |

FOREIGN PATENT DOCUMENTS

| | | |
|---|---|---|
| JP | 05-072529 | 3/1993 |
| JP | 2004-73651 | 3/2004 |
| KR | 10-2007-0002657 | 1/2007 |

* cited by examiner

*Primary Examiner* — Rhonda S Peace
(74) *Attorney, Agent, or Firm* — IPLA P.A.; James E. Bame

(57) ABSTRACT

There is provided a light-transmitting structure of a display panel for a slot machine using an electronic reel game scheme that is capable of playing other games on a reel game. The structure is located behind a touch pad. The structure allows a gamer to selectively play a typical display-based game through a separate game program while playing the reel game.

13 Claims, 12 Drawing Sheets

[Fig. 1]
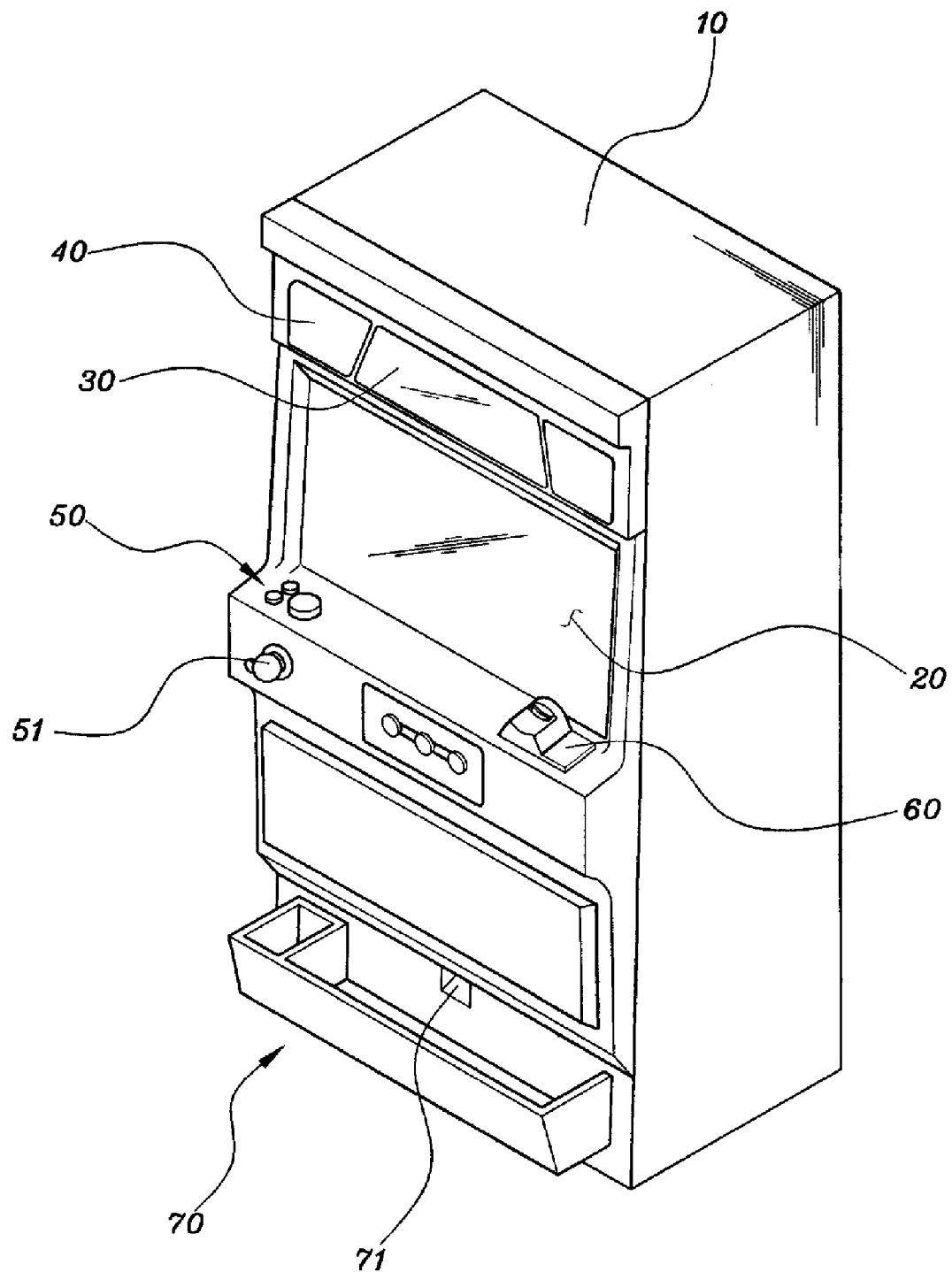

[Fig. 2]
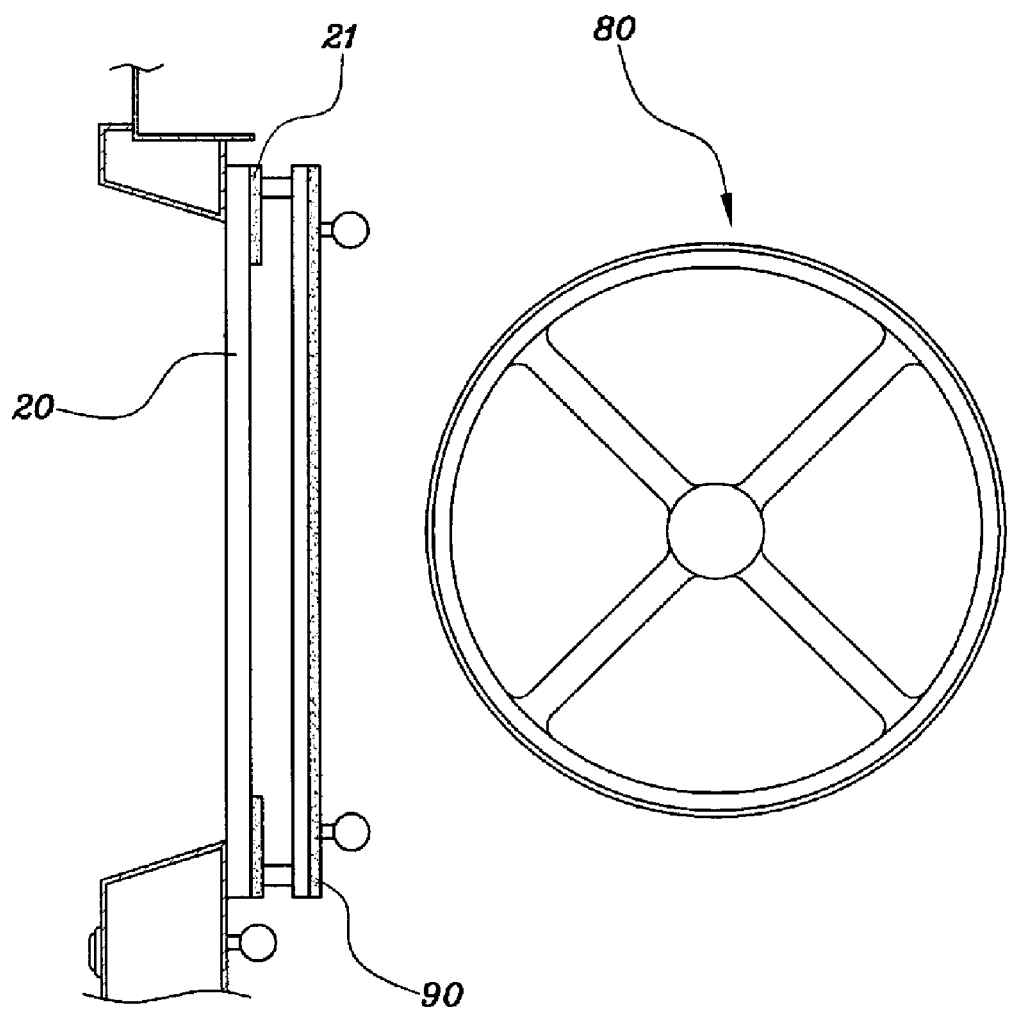

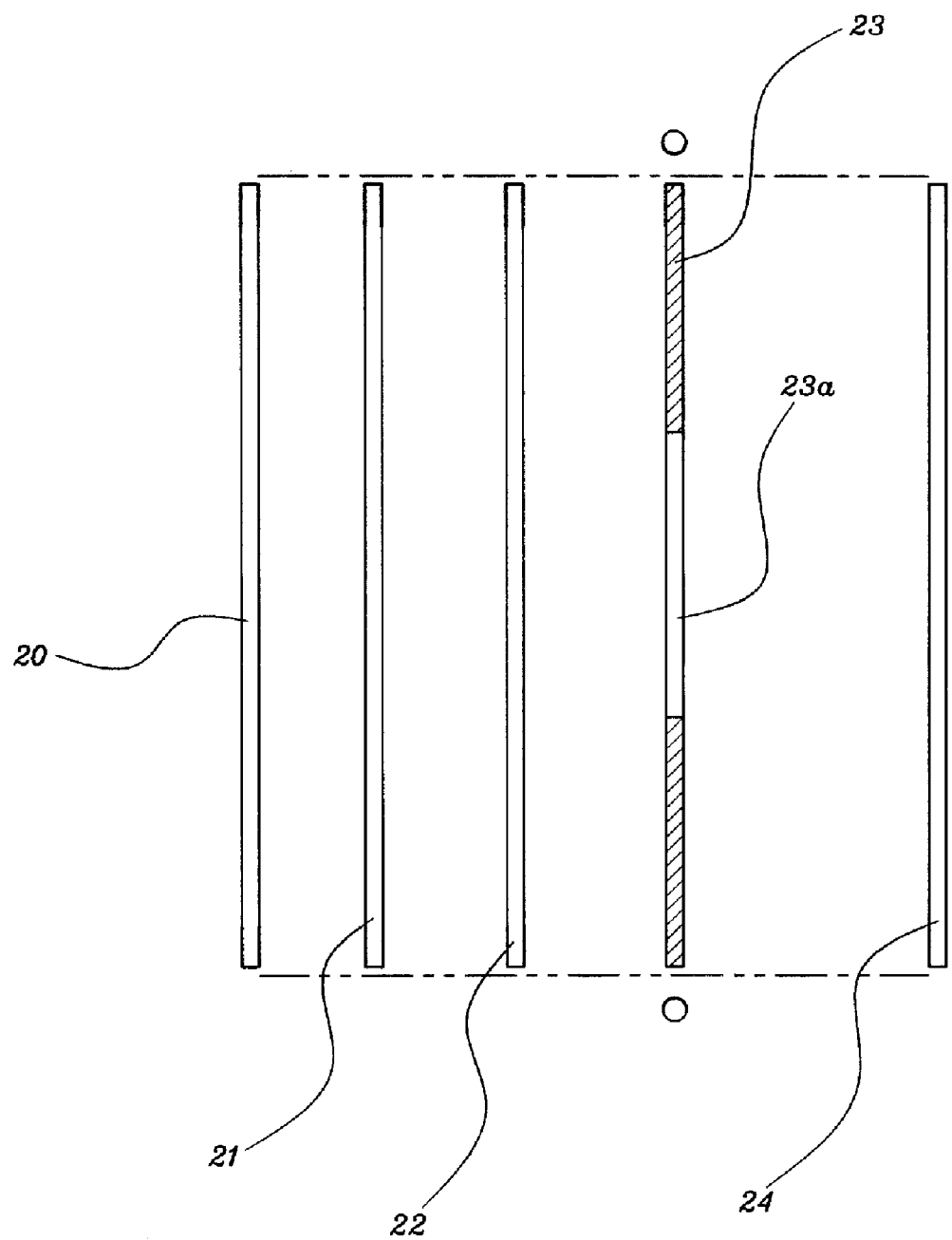
[Fig. 3]

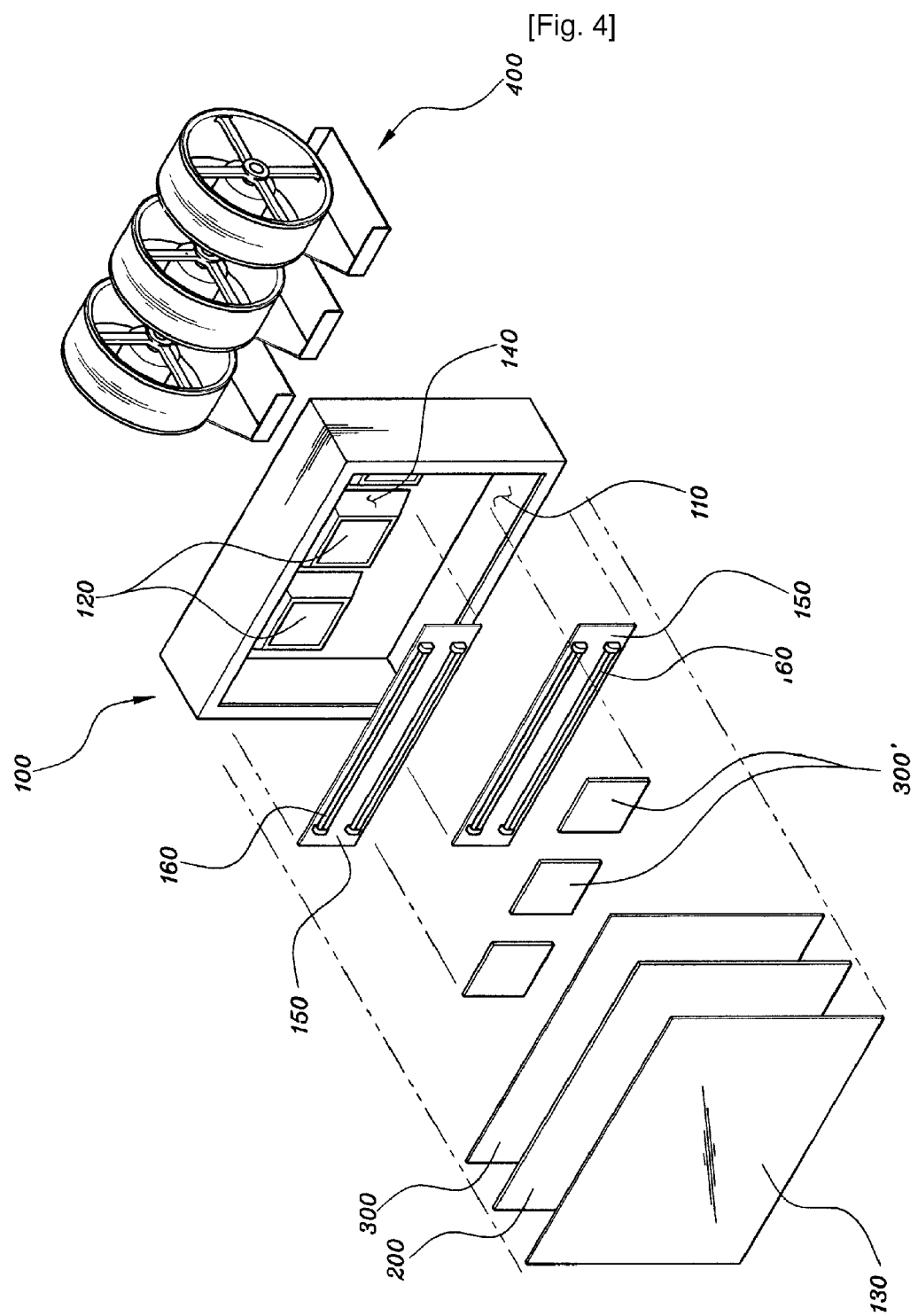
[Fig. 4]

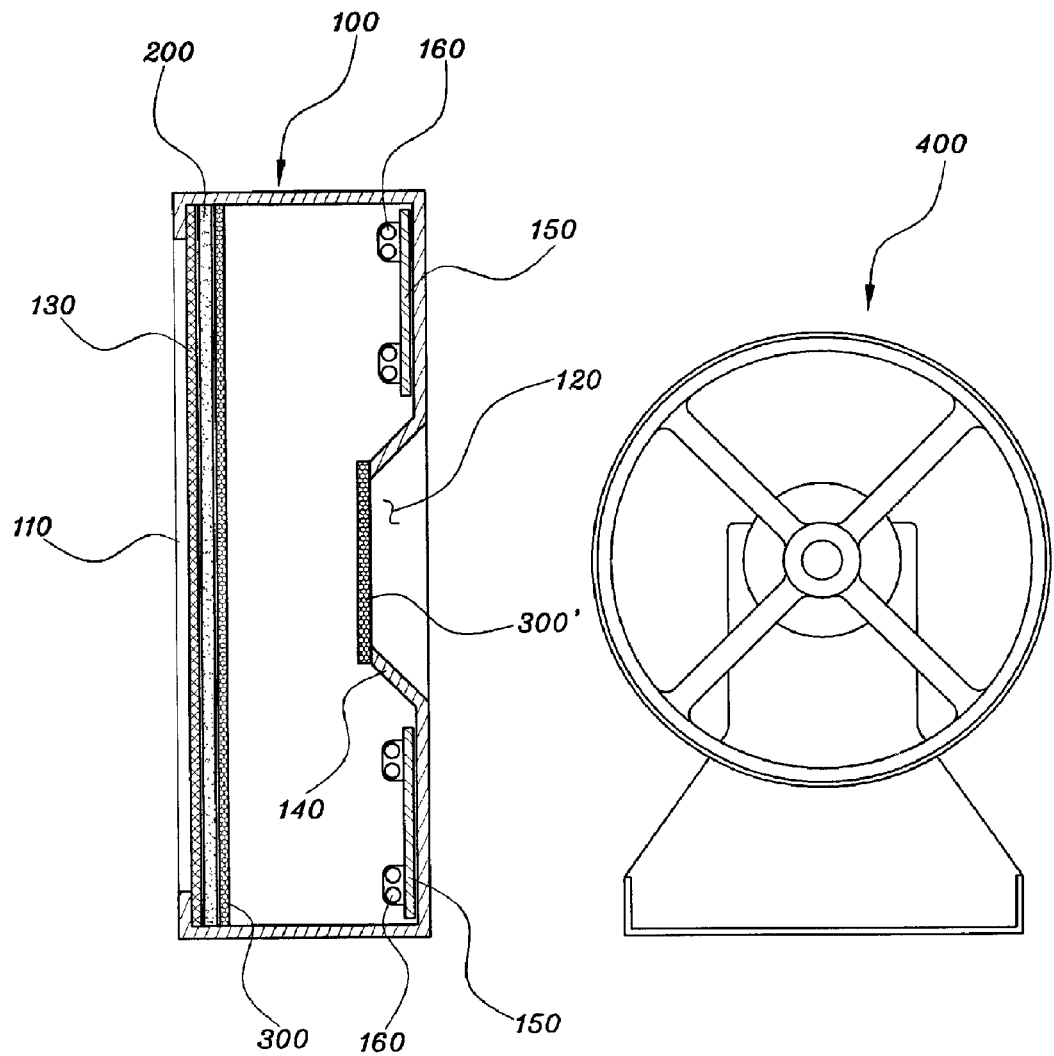
[Fig. 5]

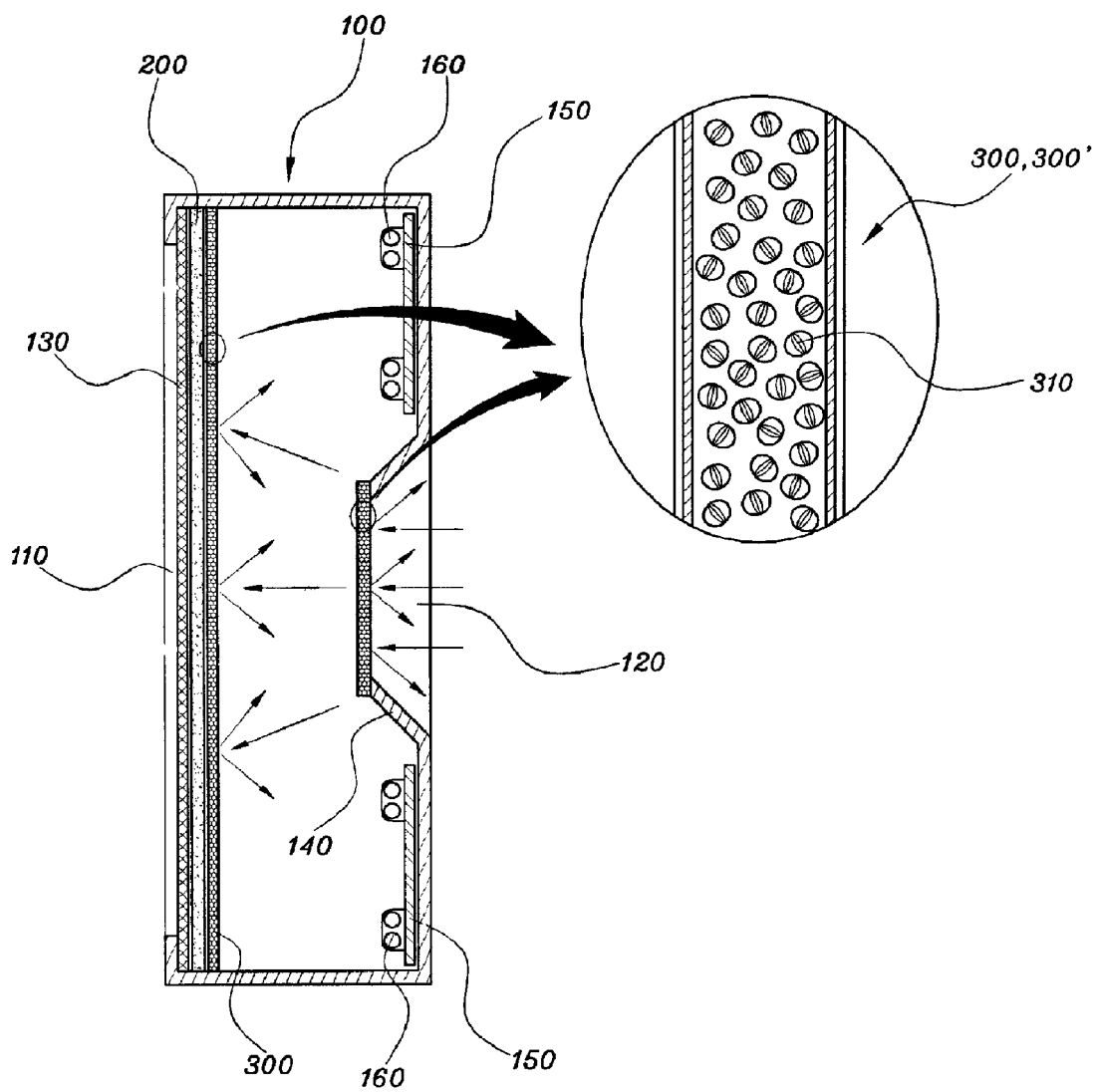

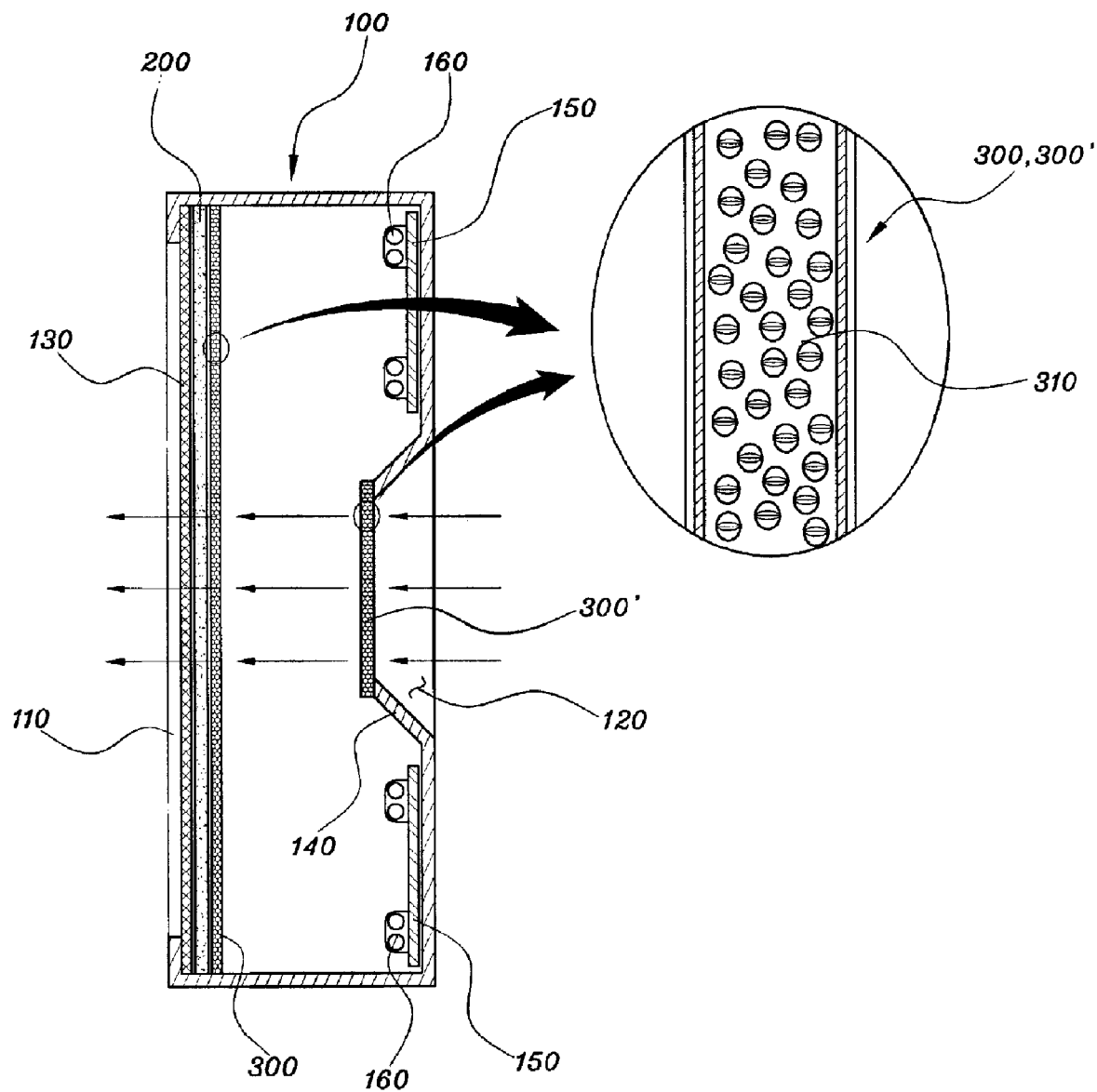
[Fig. 7]

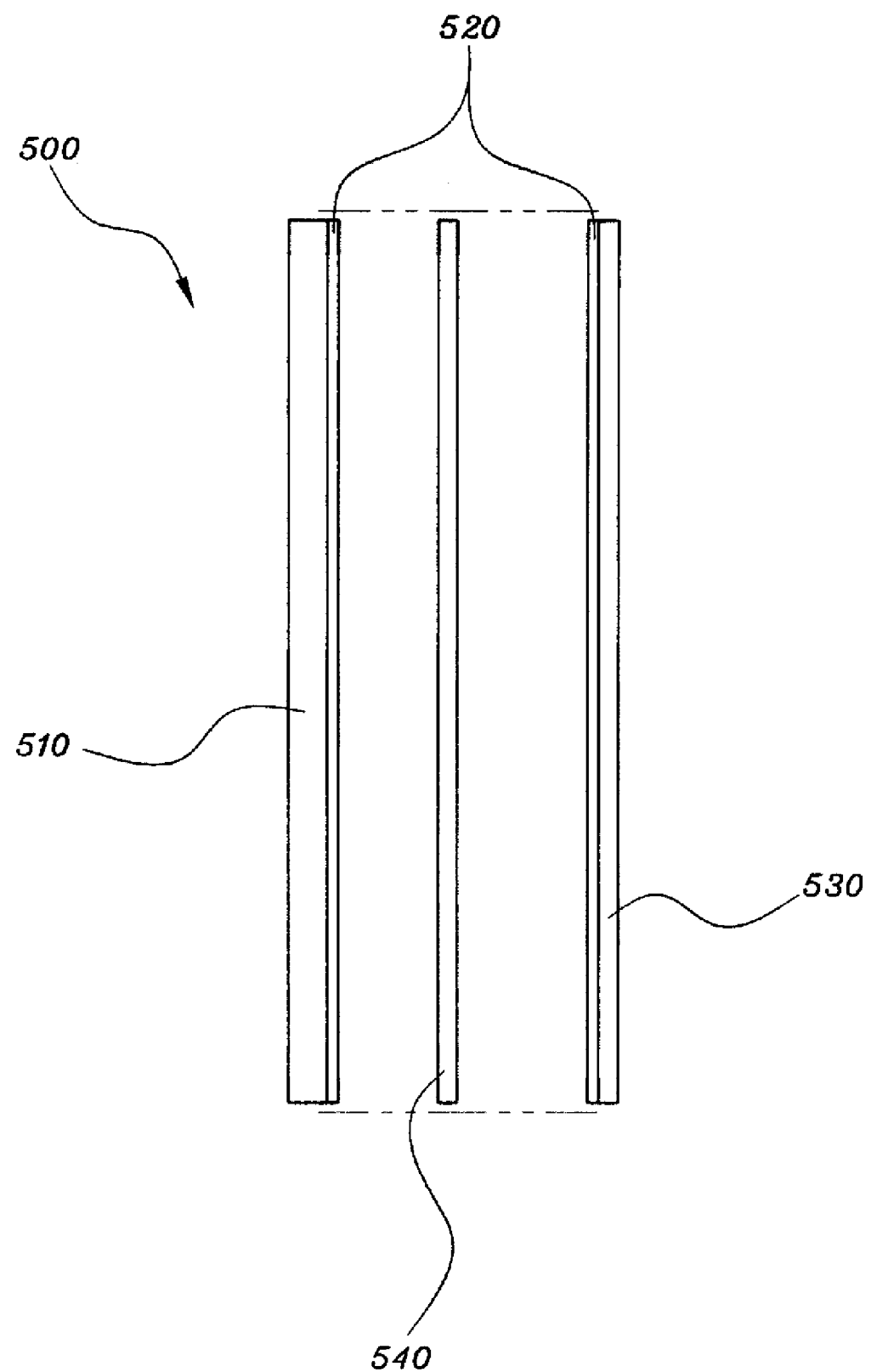
[Fig. 8]

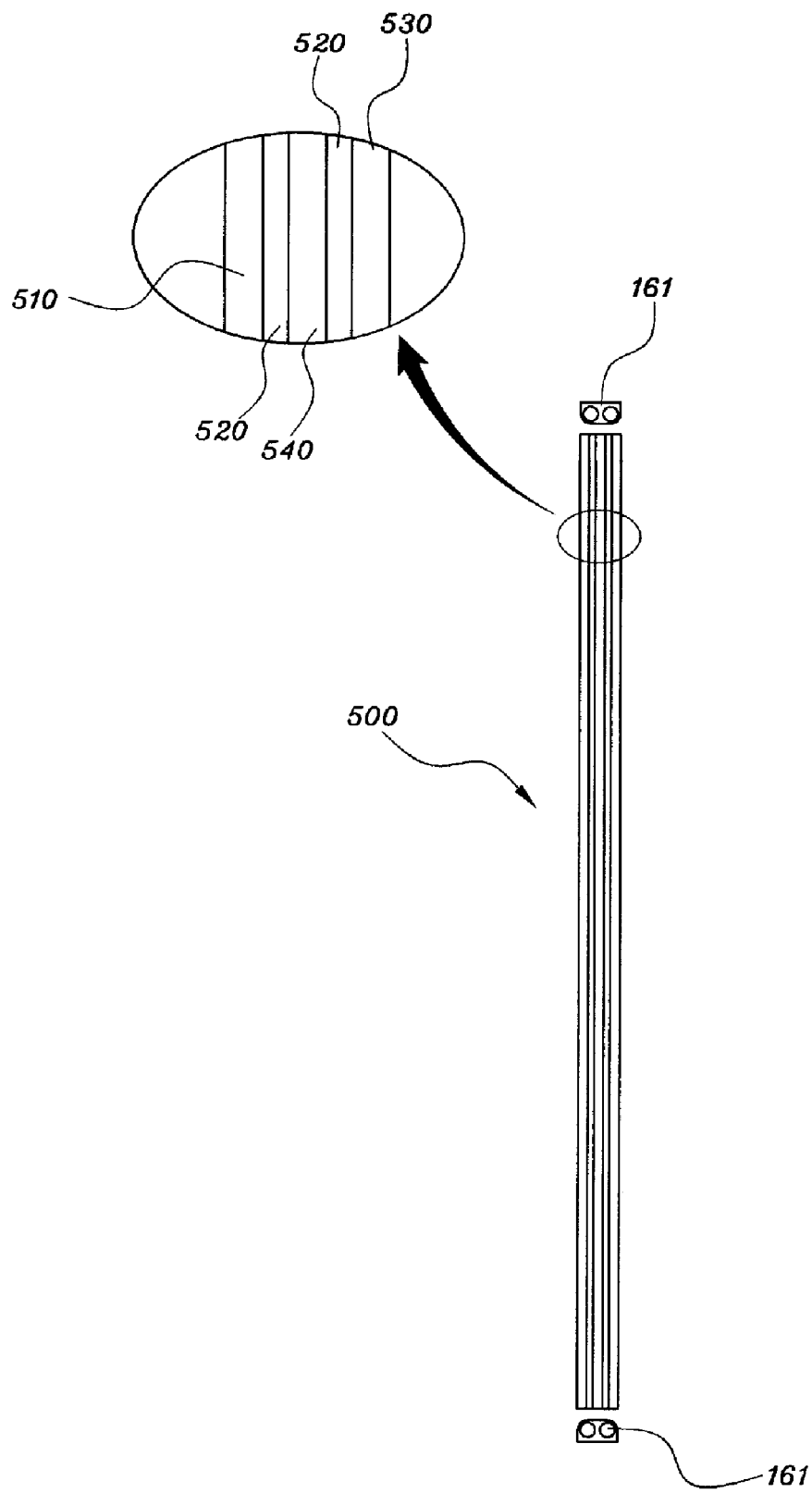
[Fig. 9]

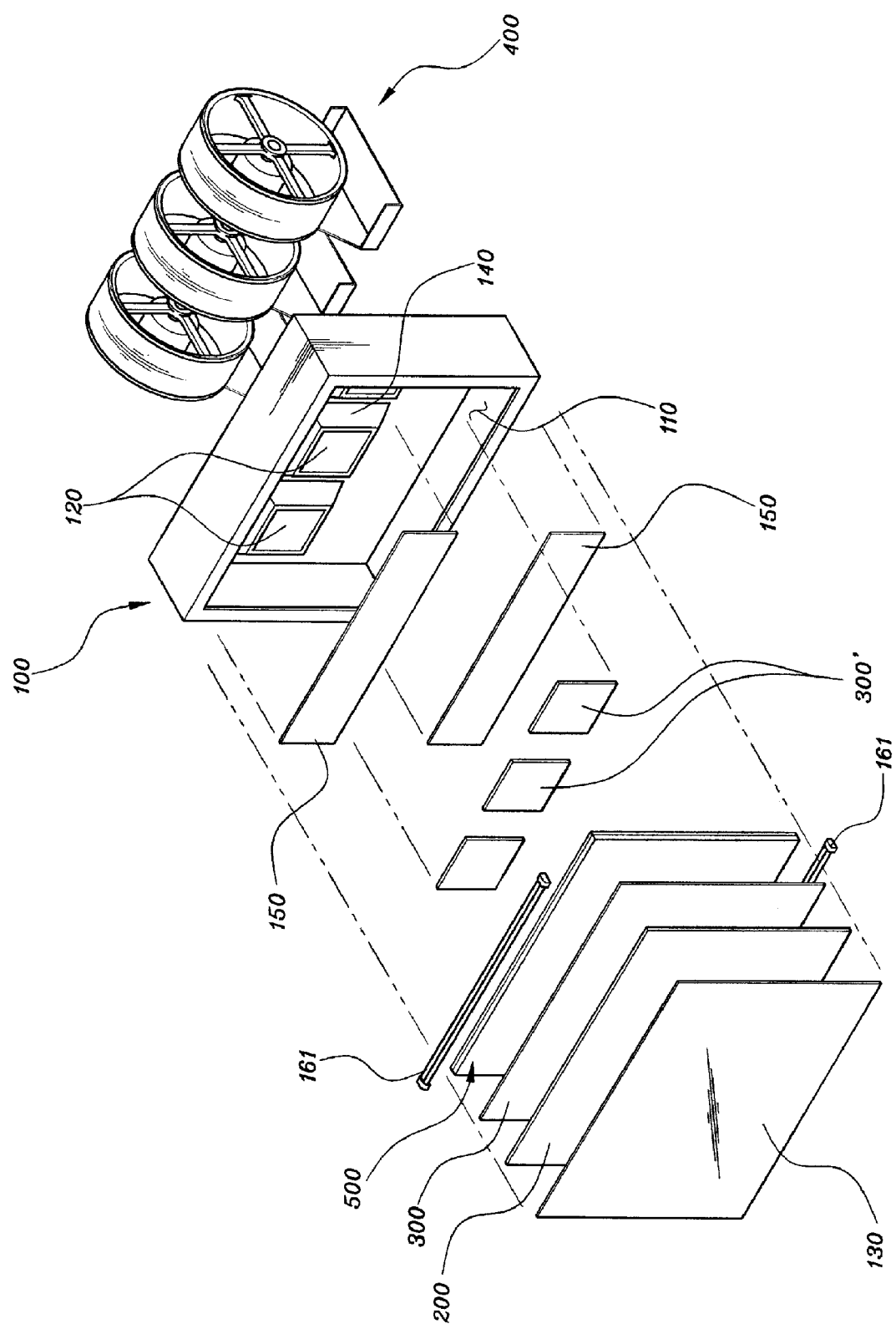
[Fig. 10]

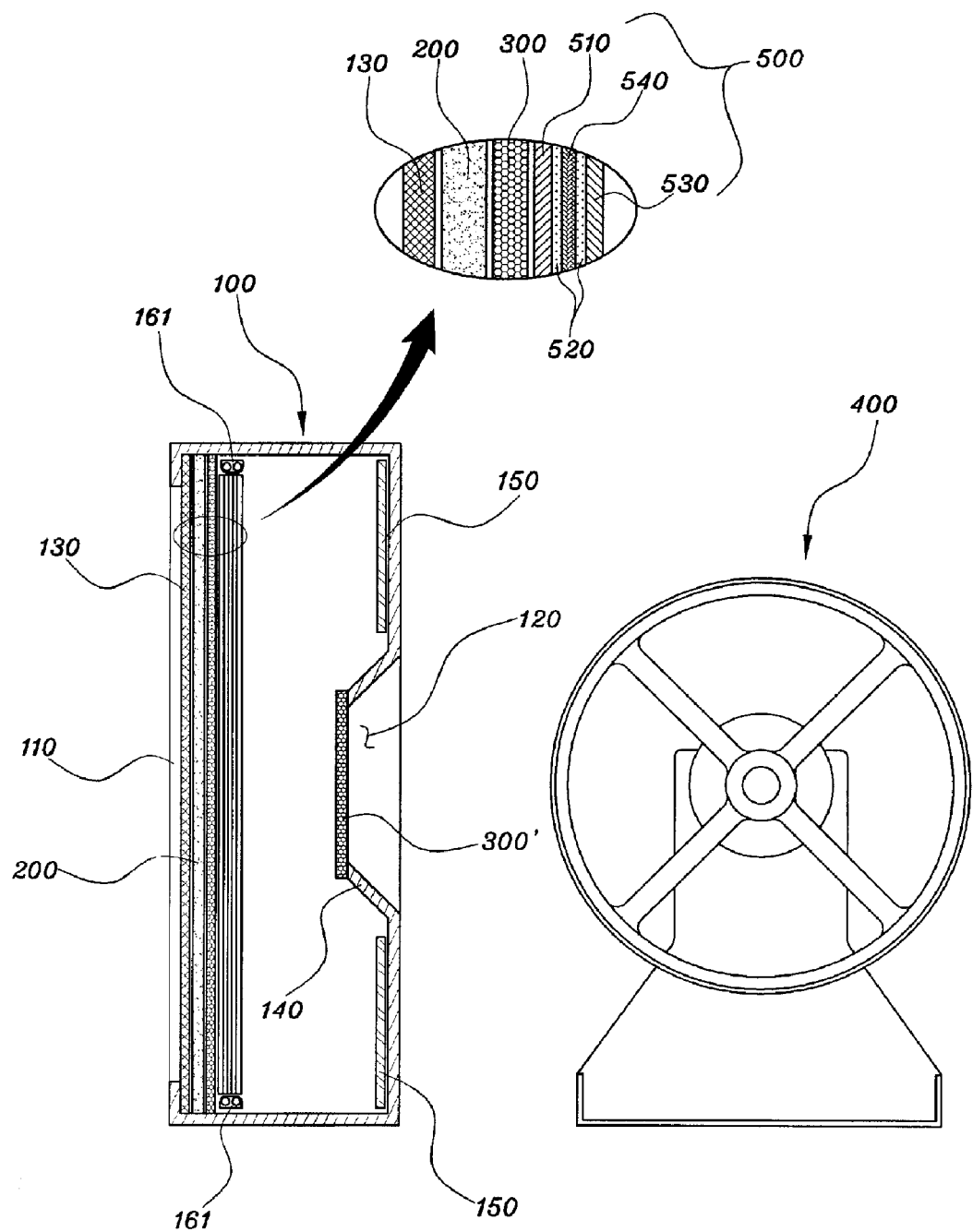

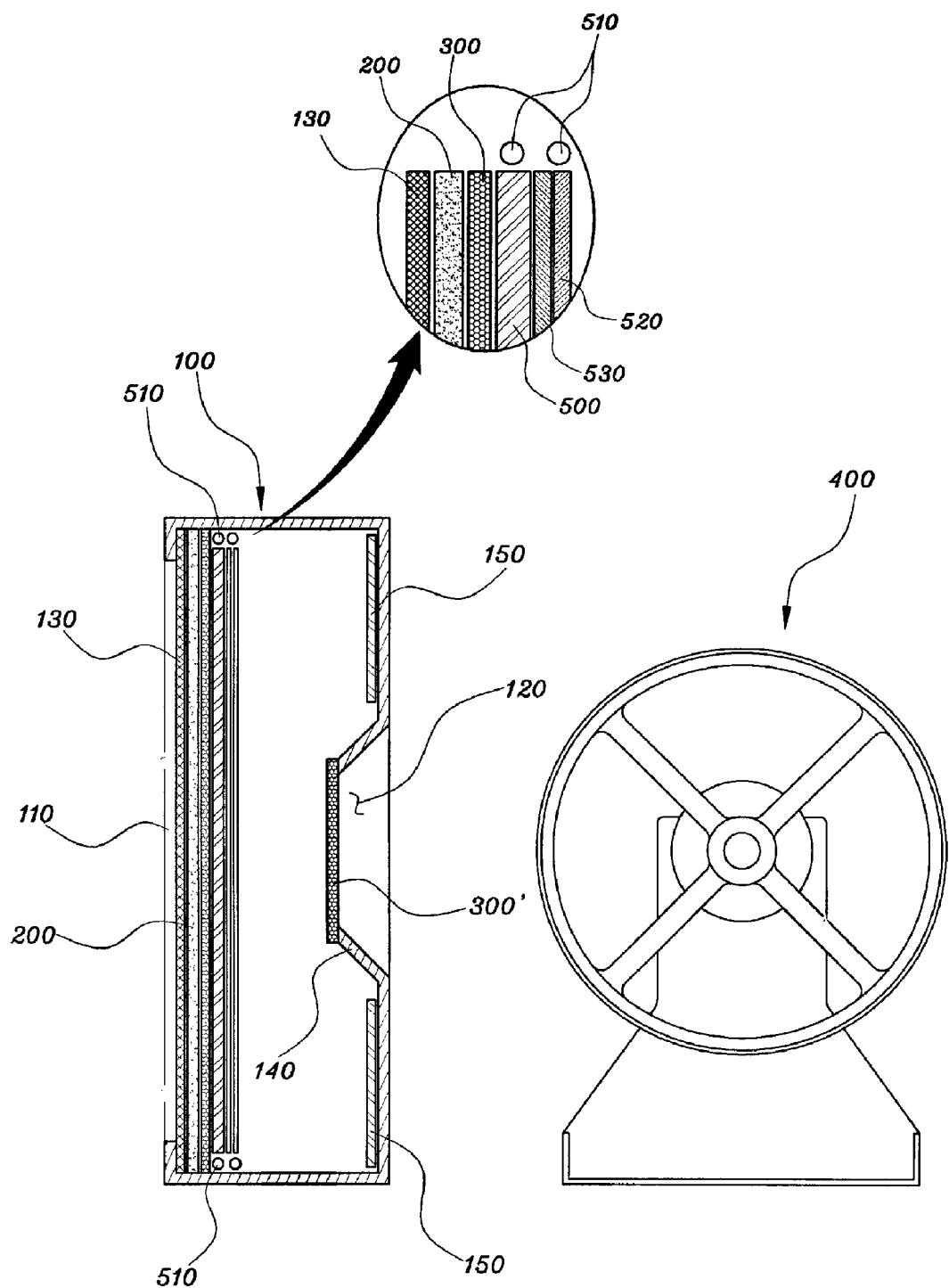
[Fig. 12]

SOLT MACHINE-REEL GAME CONVERSION TYPE PICTURE ON THE SCREEN DISPLAY PANEL REFLECT STRUCTURE

TECHNICAL FIELD

The present invention relates to a light-transmitting structure of a display panel for a slot machine using reels capable of playing other games on a reel game, in which a gamer can selectively play typical display-based games through separate game programs while playing the reel game.

BACKGROUND ART

A slot machine originates from a pachinko and a reel game. The reel game is a puzzle game as provided by a slot machine. Current game machines mainly installed in most of adult amusement rooms are electronic slot machines providing an electronic reel game in which symbols on reels are displayed on a full screen and are selected by operating push buttons.

An example of an electronic game machine for such an electronic reel game is disclosed in Japanese Patent Laid-open Publication No. 2004-73651 (Mar. 11, 2004). FIG. 1 is a perspective view illustrating a typical electronic reel game machine. Referring to FIG. 1, the game machine comprises a front display panel 20 for displaying an image using light transmitted toward a cabinet 10 through inner reels 80, a speaker 40 and a dividend indication part 30 disposed over the display panel 20, betting and start switches 50 and 51 disposed below the display panel 20, a coin inlet 60 disposed on a side of the cabinet, and a coin receiver 70 and a coin outlet 71 disposed in a lower portion of the casing 10.

In the electronic reel game machine, when the reels 80 having a plurality of symbols formed on an outer surface thereof rotate and then stop, some of the symbols on the reels 80 appearing on the display panel 20 are illuminated by light from lamps and are displayed to a gamer, as shown in FIG. 2.

The electronic reel game machine provides only a single reel game. Accordingly, a gamer cannot play other games using such a game machine.

Referring to FIG. 2, the reel game machine comprises an electronic shutter 90 provided between the display panel 20 and the reels 80 for blocking light from being transmitted through the reels 80 to block the symbols on the reels 80 so that a highlighted content or a desired image is displayed to the gamer.

Referring to FIG. 3, the reel game machine further comprises a prism 21, a diffuser 22, a light guide plate 23, and a reflective plate 24 sequentially arranged between the display panel 20 and the electronic shutter 90, and the light guide plate 23 includes an aperture 23a having the same size as the symbols on the reels 80. Thus, it is difficult to constitute a display unit. It is also difficult to implement other games using the display panel 20, which will be sought by the present invention, while playing the reel game. This requires separate game machines.

Both the reel game machine and other game machines must be installed to satisfy demands of gamers. This requires a considerable installation area and increases an installation cost.

DISCLOSURE OF INVENTION

Technical Problem

Therefore, the present invention has been made to solve the above problems, and it is an object of the present invention to provide a slot machine using an electronic reel game scheme comprising a display panel modified so that a gamer selectively plays other games while playing a reel game.

Technical Solution

Exemplary embodiments of the present invention provide a display panel structure located behind a touch pad in a slot machine using an electronic reel game scheme, comprising: a frame; a liquid crystal display (LCD) panel fixed to a front end of the frame 100 and disposed in the frame; a first polymer dispersed liquid crystal ("PDLC") film disposed behind the LCD panel; reflective plates spaced from the first PDLC film, fixed to a rear side of the frame, and disposed in the frame; lamps disposed on a front surface of the reflective plates; and a second PDLC film disposed at rear apertures of the frame.

Advantageous Effects

According to the present invention, a gamer can play a reel game or play a display-based game by stopping the reel game, selectively blocking incident light, and then loading the display-based game through a program. Thus, the gamer can play various games using one game machine. Also, the gamer does not have to install separate game machines for the games, thus minimizing an installation area for the game machine and greatly reducing an installation cost.

BRIEF DESCRIPTION OF THE DRAWINGS

FIG. 1 is a perspective view illustrating a typical electronic reel game machine;

FIG. 2 is a schematic front view illustrating a conventional reel game machine;

FIG. 3 is a schematic sectional view illustrating components of a conventional display panel;

FIG. 4 is an exploded perspective view illustrating a display panel structure according to the present invention;

FIG. 5 is a schematic front view illustrating a display panel and a reel according to the present invention;

FIG. 6 is a schematic sectional view illustrating a state where other game programs are loaded to play display-based games on a display, in which an electric field is not applied and light is not transmitted through a PDLC film;

FIG. 7 is a schematic sectional view illustrating a state where liquid crystal droplets are arranged in the same direction of an electric field applied to a PDLC film so that a reel game is played; and FIGS. 8 to 12 illustrate other embodiments of the present invention.

BEST MODE FOR CARRYING OUT THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention. Like numbers refer to like element.

MODE FOR THE INVENTION

A light-transmitting structure of a display panel for a slot machine using an electronic reel game scheme is provided that is capable of playing other games on a reel game. The structure is located behind a touch pad 130 and comprises: a frame 100 including a front aperture 110 and rear apertures 120, the front aperture 110 having a relatively larger aperture area than the rear apertures 120; a liquid crystal display (LCD) panel 200 fixed to a front side of the frame 100 and disposed in the frame 100; a first polymer dispersed liquid crystal ("PDLC") film 300 disposed behind the LCD panel and having the same or similar size as the LCD panel; reflective plates 150 spaced from the first PDLC film 300, fixed to a rear side of the frame 100, and disposed in the frame 100; lamps 160 disposed on a front surface of the reflective plates 150; and a second PDLC film 300' disposed at the rear apertures 120 of the frame 100.

Also, a light-transmitting structure of a display panel for a slot machine using an electronic reel game scheme is provided that is capable of playing other games on a reel game. The structure is located behind a touch pad 130 and comprises: a frame 100 including a front aperture 110 and rear apertures 120, the front aperture 110 having a relatively larger aperture area than the rear apertures 120; an LCD panel 200 fixed to a front side of the frame 100 and disposed in the frame 100; a first PDLC film 300 disposed behind the LCD panel and having the same or similar size as the LCD panel; a third PDLC light guide plate 500 having lamps 161 disposed on sides thereof; and reflective plates 150 spaced from the third PDLC light guide plate 500, fixed to a rear side of the frame 100, and disposed in the frame 100.

First Embodiment

The present invention provides an image implementing scheme by which a gamer can play typical games on a liquid crystal display (LCD) panel while playing an electronic reel game. Referring to FIG. 4, the display panel structure comprises a frame 100 for covering an LCD panel; the LCD panel and a polymer dispersed liquid crystal ("PDLC") film disposed in the frame; and reels disposed behind the frame.

The frame 100 has a front aperture 110, rear apertures 120, an internal touch pad 130, and bends 140 formed in the rear apertures 120.

Preferably, the number of the rear apertures 120 corresponds to the number of symbols on reels 400.

In the present embodiment, the display panel structure includes a plurality of rear apertures 120. In other embodiments, the display panel structure may include a single rear aperture 120.

The LCD panel 200 is located before the frame 100, i.e., behind the touch pad 130 for displaying an image for a separate display-based game, which is loaded by a game program, on the LCD panel 200.

A gamer, while playing the reel game or when desiring to play other games, may operate a game select button (e.g., a switching button) of a game machine to block light from being transmitted through the PDLC film. This stops rotation of the reels 400 and the symbols arranged on an outer surface of the reels 400 are not displayed on the LCD panel 200. In this case, the gamer may operate the touch pad 130 to execute a separate game program and play a display-based game other than the reel game on the LCD panel 200.

A display-based game loading scheme and a program execution scheme do not greatly differ from conventional schemes that use a display panel. Since the display-based game loading scheme and the program execution scheme are not included in the scope of the present invention, a detailed description thereof will be omitted herein.

The PDLC film is liquid crystal that contains fine LC droplets in a polymer material and displays information according to a principle that the LC droplets diffuse or absorb light in response to an external applied voltage. LC cells in the LCD are used to control light transmission according to light diffusion intensity, thus requiring no polarizer.

As a current primary liquid crystal display, Twisted Nematic (TN) or Super Twisted Nematic (STN) display employs a polarizer. This display has bad contrast resulting from low efficiency of light use, requires surface alignment to cause complicated rubbing around Thin Film Transistor (TFT) elements at a high pixel density, and has a viewing angle as small as about 20°. Accordingly, there have been efforts to use a light transmission and diffusion mode instead of polarization in a display, resulting in a PDLC composite with an optical diffusion mode in which liquid crystal is dispersed in a polymer, and a Polymer Network Liquid Crystal (PNLC) composite. Characteristics of the PDLC films 300 and 300', named a polymer dispersed liquid crystal composite or polymer dispersed liquid crystal, are used to embody the present invention.

The PDLC films 300 and 300' contain LC droplets 310 having a diameter of 1~2 μm dispersed in a polymer layer, instead of a conventional liquid crystal layer, between a pair of transparent substrates. When an electric field is not applied across the PDLC films 300 and 300', a refractive index of the liquid crystal does not match that of the polymer, which makes incident light diffused and cells opaque, resulting in a black state. When the electric field is applied, the liquid crystal is arranged in a direction of the electric field, which makes cells transparent and in a white state so that the incident light is transmitted. The use of the light diffusion and transmission principle instead of the polarization helps increase efficiency of light use over a conventional liquid crystal display device, resulting in excellent brightness and an excellent viewing angle for switchable display.

The PDLC films 300 and 300' can be used as a switchable window only if they are switched in a range of about 100V because of their relatively higher driving voltage as compared to a conventional liquid crystal display device. The PDLC films 300 and 300' can also be used for a moving picture display because of their low driving voltage, high response speed, and high voltage holding rate (VHR). In order for the gamer to play the other games while playing the reel game, the PDLC films 300 and 300' are used in the present invention.

According to the present invention, the PDLC films 300 and 300' are used in pair, i.e., a first PDLC film 300 located behind the LCD panel 200 and a second PDLC film 300' spaced from the first PDLC film 300 and fixed to the rear apertures 120 of the frame 100.

Here, a number of the second PDLC films 300' corresponding to the symbols formed on the outer surface of the reels 400 are arranged to simulate holes of a light guide plate for a conventional reel game and eliminate a need for the light guide plate, which is a main component of the conventional reel game machine, and for complex processes including punching the light guide plate.

Meanwhile, the display panel structure further comprises a reflective plates 150 disposed in the frame 100 having the second PDLC film 300', and lamps 160 disposed before the reflective plates 150.

The present display panel structure comprising the touch pad 130, the LCD panel 200, the first and second PDLC films 300 and 300', the reflective plates 150, and the lamps 160 disposed in the frame 100 is much simpler than a display panel structure of a conventional reel game machine.

Second Embodiment

The objects of the present invention can be accomplished by a display panel structure as shown in FIGS. 8 to 10.

The first embodiment employs a direct type in which the lamps 160 are located on a rear side while the second embodiment may employ a third PDLC light guide plate 500 located on a rear side.

The display panel structure comprises lamps 161 disposed on sides of the third PDLC light guide plate 500.

The display panel structure does not comprise the lamps 160 located on the front surface of the reflective plates 150 according to the first embodiment, but may comprise the reflective plates 150, if necessary.

Referring to FIG. 11, the third PDLC light guide plate 500 comprises a transparent light guide plate 510, a transparent member 530 disposed behind the transparent light guide plate 510, transparent electrodes 520 disposed on one side of the transparent light guide plate 510 and one side of the transparent member 530, and a liquid crystal layer 540 disposed between the transparent light guide plate 510 and the transparent member 530.

The liquid crystal layer 540 may be formed of PDLC, as in the first embodiment. Alternatively, the liquid crystal layer 540 may be formed of a material such as glass or acrylic that is capable of reflecting light on one surface thereof.

Preferably, the transparent electrodes 520 are formed of Indium-Tin Oxide (ITO) or Indium-Zinc-Oxide (IZO). The ITO is a transparent conductive material, which may also be used as a PDP or LCD panel that is a thin flat display panel according to the present invention. The transparent electrodes 520 include a plurality of row electrodes and a plurality of column electrodes arranged in matrix. A signal is applied to an electrode corresponding to a selected row and a selected column so that a corresponding cell emits light.

The IZO is a transparent electrode having an amorphous structure.

The transparent electrodes 520 of ITO or IZO may have a planar shape or any other shape for various display effects. The transparent electrodes 520 apply an electric field across the liquid crystal layer 540 to effectively control to transmit and block light, resulting in a display having a specific shape.

The display panel structure according to the second embodiment allows a gamer to efficiently play the reel game and to play a display-based game loaded by s separate program on the LCD panel 200 when not playing the reel game, as in the first embodiment.

If the display panel structure according to the present invention is utilized to play an electronic reel game on a game machine such as a slot machine using the reels 400 and when a separate stop button or any other stop means is operated to stop the reels 400, symbols are located in a selection area of the second PDLC film 300' located before the reels 400, and winning information is displayed to the gamer.

That is, when the electronic reel game is played, the symbols in the selected area among the symbols formed on the outer surface of the reels 400 and winning information including winning money must be displayed to the gamer.

As the light emitted from the lamps (not shown) located behind the reels 400, and accordingly, the symbols located in the selected area of the reels 400 are transmitted through the second PDLC film 300' and the first PDLC film 300 and then displayed on the LCD panel 200. Thus, the gamer can confirm the winning information.

In order for the symbols on the reels 400 to be transmitted through the first and second PDLC films 300 and 300' or the third PDLC light guide plate 500 and displayed on the LCD panel 200, i.e., in order for the gamer to play the reel game, an electric field is applied to the first and second PDLC films 300 and 300' and accordingly the LC droplets 310 in the first and second PDLC films 300 and 300' are arranged in a direction of the electric field, such that the incident light is transmitted through the first and second PDLC films 300 and 300' and the symbols on the reels 400 are displayed on the LCD panel 200.

Accordingly, the gamer can confirm whether or not he or she wins a prize in the reel game.

Meanwhile, an image showing the winning information including winning money may be displayed with different colors by mixing the first and second PDLC films 300 and 300' and the third PDLC light guide plate 500 with R, G, and B pigments and precipitating the resultant films and plate.

For example, R, G, and B pigments charged by a voltage applied via the pixel electrode are precipitated in the first and second PDLC films 300 and 300' which are formed of R, G, and B pigments coated with an organic film and charged and a mixed solution including liquid crystal and a polymer solution. Then, the mixed solution is selectively exposed by ultraviolet (UV) rays to phase-separate the liquid crystal from the polymer and then the liquid crystal droplets 310 are created. Also, the liquid crystal droplets 310 are subjected to photopolymerization for patterning. The mixed solution selectively exposed by UV is then developed to remove a non-exposed portion of the mixed solution. This results in the first and second PDLC films 300 and 300' and the third PDLC light guide plate 500 comprising a striped mixed layer having the same function of a R, G, and B color filter.

Alternatively, various methods may be employed by which the first and second PDLC films 300 and 300' or the third PDLC light guide plate 500 are or is mixed with the R, G, and B pigments to obtain desired effects.

As the first and second PDLC films 300 and 300' or the third PDLC light guide plate 500 are or is mixed with the R, G, and B pigments, winning information including winning money can be displayed with different colors on the reel game.

Moreover, when the gamer stops playing the reel game for a little while or desires to play other games on the LCD panel 200, the electric field is caused not to be applied to the first and second PDLC films 300 and 300'. In this case, the refractive index of the liquid crystal does not match that of the polymer, such that the incident light is diffused and each cell becomes opaque. As a result, the symbols on the reels 400 become in a black state on the first and second PDLC films 300 and 300' and are not projected to the LCD panel 200.

In the second embodiment, the respective cells become transparent or opaque and the symbols are projected or not projected according to whether or not the electric field is applied to the transparent electrodes 520 of the third PDLC light guide plate 500.

As a result, the gamer can play various display-based games on the LCD panel 200 by loading the games using the touch pad 130 when the symbols on the reels 400 are not displayed.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

INDUSTRIAL APPLICABILITY

According to the present invention, a display panel structure for a game machine using an electronic reel game scheme can be simply implemented without a prism, a diffuser, a light guide plate, and the like that have been used in conventional display panel structure, thereby simplifying a manufacturing process and reducing a manufacturing cost.

The invention claimed is:

1. A light-transmitting structure of a display panel for a slot machine using an electronic reel game scheme that is capable of playing other games on a reel game, the structure being located behind a touch pad (130) and comprising:
    a frame 100 including a front aperture (110) and rear apertures (120), the front aperture (110) having a relatively larger aperture area than the rear apertures (120);
    a liquid crystal display (LCD) panel (200) fixed to a front side of the frame (100) and disposed in the frame (100);
    a first polymer dispersed liquid crystal ("PDLC") film (300) disposed behind the LCD panel and having the same or similar size as the LCD panel;
    reflective plates (150) spaced from the first PDLC film (300), fixed to a rear side of the frame (100), and disposed in the frame (100);
    lamps (160) disposed on a front surface of the reflective plates (150); and
    a second PDLC film (300') disposed at the rear apertures (120) of the frame (100).

2. The structure of claim 1, wherein areas of the second PDLC film (300') and the third PDLC light guide plate (500) to which an electric field is applied have the same or similar size as symbols on reels (400).

3. The structure of claim 1, wherein the first or second PDLC film (300) or (300') is mixed with R, G, and B pigments to provide additional symbols on the reels (400).

4. A light-transmitting structure of a display panel for a slot machine using an electronic reel game scheme that is capable of playing other games on a reel game, the structure being located behind a touch pad (130) and comprising:
    a frame (100) including a front aperture (110) and rear apertures (120), the front aperture (110) having a relatively larger aperture area than the rear apertures (120);
    an LCD panel (200) fixed to a front side of the frame (100) and disposed in the frame (100);
    a first PDLC film (300) disposed behind the LCD panel and having the same or similar size as the LCD panel;
    a third PDLC light guide plate (500) having lamps (161) disposed on sides thereof; and
    reflective plates (150) spaced from the third PDLC light guide plate (500), fixed to a rear side of the frame (100), and disposed in the frame (100).

5. The structure of claim 4, wherein the third PDLC light guide plate (500) is mixed with R, G, and B pigments to provide additional symbols on the reels (400).

6. The structure of claim 5, wherein the transparent electrodes (520) have various shapes.

7. The structure of claim 4, wherein the third PDLC light guide plate (500) comprises a transparent light guide plate (510), a transparent member (530) disposed behind the transparent light guide plate (510), transparent electrodes (520) deposited on one surface of the transparent light guide plate (510) and one surface of the transparent member (530), and a liquid crystal layer (540) disposed between the transparent electrodes (520).

8. The structure of claim 7, wherein the transparent member (530) comprises any one of a transparent film, glass, and acrylic.

9. The structure of claim 7, wherein the liquid crystal layer (540) comprises PDLC.

10. The structure of claim 7, wherein the transparent electrodes (520) comprise Indium-Tin Oxide (ITO) or Indium-Zinc-Oxide (IZO).

11. The structure of claim 7, wherein the transparent electrodes (520) have the same size as the transparent light guide plate (510).

12. The structure of claim 4, further comprising one of a second PDLC film (300'), a transparent film, glass, and acrylic disposed at the rear aperture (120) of the frame (100).

13. The structure of claim 4, wherein areas of the second PDLC film (300') and the third PDLC light guide plate (500) to which an electric field is applied have the same or similar size as symbols on reels (400).

* * * * *